(12) United States Patent
DeRosa et al.

(10) Patent No.: US 9,128,777 B2
(45) Date of Patent: Sep. 8, 2015

(54) OPERATING AND MAINTAINING A CLUSTER OF MACHINES

(71) Applicant: Google Inc., Mountain View, CA (US)

(72) Inventors: Michael DeRosa, Pittsburgh, PA (US);
Brian McBarron, Harrison City, PA (US); Brian Neil Makin, Pittsburgh, PA (US); Hal Joseph Burch, Murrysville, PA (US)

(73) Assignee: Google Inc., Mountain View, CA (US)

( * ) Notice: Subject to any disclaimer, the term of this patent is extended or adjusted under 35 U.S.C. 154(b) by 332 days.

(21) Appl. No.: 13/751,854

(22) Filed: Jan. 28, 2013

(65) Prior Publication Data

US 2014/0215486 A1    Jul. 31, 2014

(51) Int. Cl.
G06F 9/46      (2006.01)
G06F 9/50      (2006.01)
G06F 9/48      (2006.01)

(52) U.S. Cl.
CPC .............. G06F 9/5088 (2013.01); G06F 9/485 (2013.01)

(58) Field of Classification Search
CPC .... G06F 49/5088; G06F 9/485; G06F 9/4887
See application file for complete search history.

(56) References Cited

U.S. PATENT DOCUMENTS

| | | | | |
|---|---|---|---|---|
| 7,073,043 B2* | 7/2006 | Arimilli et al. | ............ | 711/207 |
| 7,870,153 B2* | 1/2011 | Croft et al. | .................. | 707/781 |
| 7,949,677 B2* | 5/2011 | Croft et al. | .................. | 707/781 |
| 8,078,843 B2* | 12/2011 | Alexander et al. | ............ | 712/216 |
| 8,095,782 B1* | 1/2012 | Danskin et al. | ............... | 712/228 |
| 8,638,805 B2* | 1/2014 | Sundararaman et al. | ..... | 370/412 |
| 8,869,150 B2* | 10/2014 | Sundararaman et al. | ..... | 718/101 |
| 8,869,151 B2* | 10/2014 | Sundararaman et al. | ..... | 718/101 |
| 8,869,156 B2* | 10/2014 | Aulakh et al. | ............... | 718/102 |
| 2007/0016687 A1 | 1/2007 | Agarwal et al. | | |
| 2009/0222544 A1 | 9/2009 | Xiao et al. | | |
| 2011/0106949 A1* | 5/2011 | Patel et al. | ................... | 709/226 |
| 2011/0276656 A1 | 11/2011 | Knapp et al. | | |
| 2011/0307541 A1 | 12/2011 | Walsh et al. | | |
| 2012/0023498 A1* | 1/2012 | Sundararaman et al. | ..... | 718/102 |

OTHER PUBLICATIONS

Chuah et al. "Node Density-Based Adaptive Routing Scheme for Disruption Tolerant Networks", 2006, 6 pages.*
Fu et al. "Research on Emergency Logistics Scheduling Model Based on Disruptions", 2006, pp. 2293-2297.*
International Search Report and Written Opinion for Application No. PCT/US2013/070501 dated Feb. 28, 2014.

* cited by examiner

*Primary Examiner* — Van Nguyen
(74) *Attorney, Agent, or Firm* — Honigman Miller Schwartz and Cohn LLP

(57) ABSTRACT

A method of operating a cluster of machines includes receiving a request for a disruption, determining a subset of machines of the cluster affected by the requested disruption, and determining a set of jobs having corresponding tasks on the affected machines. The method also includes computing a drain time for a drain that drains the tasks of the jobs from the affected machines, and scheduling on a drain calendar stored in non-transitory memory a drain interval for the drain. The drain interval has a start time and an end time. A maintenance system that includes a scheduler may execute such a method to maintain a cluster of machines.

41 Claims, 5 Drawing Sheets

US 9,128,777 B2

OPERATING AND MAINTAINING A CLUSTER OF MACHINES

TECHNICAL FIELD

This disclosure relates to maintenance systems for clusters of machines.

BACKGROUND

A computer cluster generally includes a set of loosely connected computers working together as a single system. The components of a cluster are usually connected to each other through local area networks, each node (e.g., computer used as a server) running its own instance of an operating system. Computer clusters emerged as a result of convergence of a number of computing trends including the availability of low cost microprocessors, high speed networks, and software for distributed computing.

To maintenance one or more nodes of a cluster, the entire cluster drained of jobs and/or storage requests to allow physical maintenance on the nodes. This may result in a significant disruption to clients using the cluster.

SUMMARY

The present disclosure provides a maintenance system that enables relatively faster, more predictable machine drains, allowing cluster management to execute large scale maintenance tasks in relatively less time than current systems. The maintenance system may coordinate drain behavior among multiple clients, reducing contention for disruptor resources of a machine cluster and making drain times more predictable. The maintenance system may build a predictive model of a drain's duration, and provides those predictions to other infrastructure components, allowing those components to anticipate upcoming drains and to change their operation accordingly.

The maintenance system can be used in computer clusters that include a set of loosely connected computers working together as a single system and rack switch reboots. For example, in super-clusters, the maintenance system may schedule mini system maintenances that drain production tasks away from machines for a limited period of time. For contracts, the maintenance system may execute permanent drains to allow modification of hardware, an owner, or a configuration of affected machines. For rack switch reboots, the maintenance system may schedule short (e.g., 5 minute) disruptions of single racks, covering an entire cluster over a period of weeks.

One aspect of the disclosure provides a method of operating a cluster of machines. The method includes receiving a request for a disruption, determining a subset of machines of the cluster affected by the requested disruption, and determining a set of jobs having corresponding tasks on the affected machines. The method also includes computing, on a data processor, a drain time for a drain that drains the tasks of the jobs from the affected machines, and scheduling on a drain calendar stored in non-transitory memory a drain interval for the drain, the drain interval having a start time and an end time.

Implementations of the disclosure may include one or more of the following features. In some implementations, the method includes determining the scheduled drain interval based on the computed drain time and other scheduled drain times of the calendar. The method may include determining the scheduled drain interval based on attributes of the disruption request. The attributes may include at least one of a drain type, a request to start as soon as possible, a request to start as soon as possible after a desired start time, a request to complete before a desired end time, or a list of affected machines.

In some implementations, the method includes computing the drain time based on a service level objective stored in non-transitory memory. The service level objective may include an eviction rule allowing a maximum number of task evictions per job over a period of drain time. In some examples, the eviction rule allows a maximum number of task evictions per job over a period of drain time based on a machine location of each task and a schedule of disruptions for the cluster. The service level objective may include an eviction quota defining an allowable amount of machine disruption over a period of time across the entire cluster.

The method may include limiting machine disruption to a failure domain of the cluster. The failure domain includes a subset of machines of the cluster, where the cluster includes multiple failure domains.

The method may include executing the drain and draining the tasks of the jobs from the affected machines. This may include evicting the tasks from the affected machines and moving the evicted tasks to other machines in the cluster unaffected by the disruption request, for example, by a scheduled maintenance time and/or according to a service level objective. The method may include monitoring a progress of the drain and providing a notification of the drain progress.

In some implementations, the method includes temporarily or permanently draining memory or jobs from the affected machines. The method may include computing a job drain time to drain the tasks each job or a storage drain time to drain memory of each affected machine.

The method may include maintaining, in non-transitory memory, a disruption request calendar for tracking disruption requests and a machine-granularity calendar for tracking disruption activity on the machines. The disruption request calendar may store for each disruption request at least one of a disruption request identifier, a drain identifier, an initial scheduled drain start time, an initial scheduled drain end time, a latest scheduled drain start time, a latest scheduled drain end time, a current drain status, or a last notification. The machine-granularity calendar may store a sequences of records, one sequence per machine, each record including at least one of a current state of jobs, a storage identifier, an owner label, a disruption event identifier, a drain start time, or an expected drain end time.

When the drain is complete, the method may include notifying a machine-state agent of the drain completion. The machine-state agent may not label the affected machines for repair when the affected machines go off-line based on the received drain completion notification. Moreover, the method may include placing non-transitory memory of the affected machines in a read-only mode when the drain is complete.

Another aspect of the disclosure provides a maintenance system for a cluster of machines. The maintenance system includes a scheduler executing on a data processor. In response to receiving a request for a disruption, the scheduler determines a subset of machines of the cluster affected by the requested disruption and determines a set of jobs having corresponding tasks on the affected machines. The scheduler computes a drain time for a drain that drains the tasks of the jobs from the affected machines and schedules on a drain calendar stored in non-transitory memory a drain interval for the drain, the drain interval having a start time and an end time.

In some implementations, the scheduler determines the scheduled drain interval based on the computed drain time and other scheduled drain times of the calendar. The scheduler may determine the scheduled drain interval based on attributes of the disruption request. The attributes may include at least one of a drain type, a request to start as soon as possible, a request to start as soon as possible after a desired start time, a request to complete before a desired end time, or a list of affected machines.

The scheduler may compute the drain time based on a service level objective stored in non-transitory memory. The service level objective may include an eviction rule allowing a maximum number of task evictions per job over a period of drain time. In some examples, the eviction rule allows a maximum number of task evictions per job over a period of drain time based on a machine location of each task and a schedule of disruptions for the cluster. The service level objective may include an eviction quota defining an allowable amount of machine disruption over a period of time across the entire cluster. The scheduler may limit machine disruption to a failure domain of the cluster. The failure domain includes a subset of machines of the cluster, where the cluster includes multiple failure domains.

In some implementations, the maintenance system includes a drain executer executing the drain and draining the tasks of the jobs from the affected machines. The drain executer may evict the tasks from the affected machines and move the evicted tasks to other machines in the cluster unaffected by the disruption request, for example, by a scheduled maintenance time and/or according to a service level objective. The scheduler may monitor a linear or non-linear progress of the drain and provide a notification of the drain progress.

The drain executer may temporarily or permanently drain memory or jobs from the affected machines. The scheduler may compute a job drain time to drain the tasks each job and/or a storage drain time to drain memory of each affected machine.

The maintenance system may include a calendar store in communication with the scheduler and maintaining, in non-transitory memory, a disruption request calendar for tracking disruption requests and a machine-granularity calendar for tracking disruption activity on the machines. The disruption request calendar may store for each disruption request at least one of a disruption request identifier, a drain identifier, an initial scheduled drain start time, an initial scheduled drain end time, a latest scheduled drain start time, a latest scheduled drain end time, a current drain status, or a last notification. The machine-granularity calendar may store a sequences of records, one sequence per machine, each record including at least one of a current state of jobs, a storage identifier, an owner label, a disruption event identifier, a drain start time, or an expected drain end time.

The scheduler may notify a machine-state agent of a drain completion. The machine-state agent may not label the affected machines for repair when the affected machines go off-line based on the received drain completion notification. Moreover, the machine-state agent may placing non-transitory memory of the affected machines in a read-only mode when the drain is complete.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
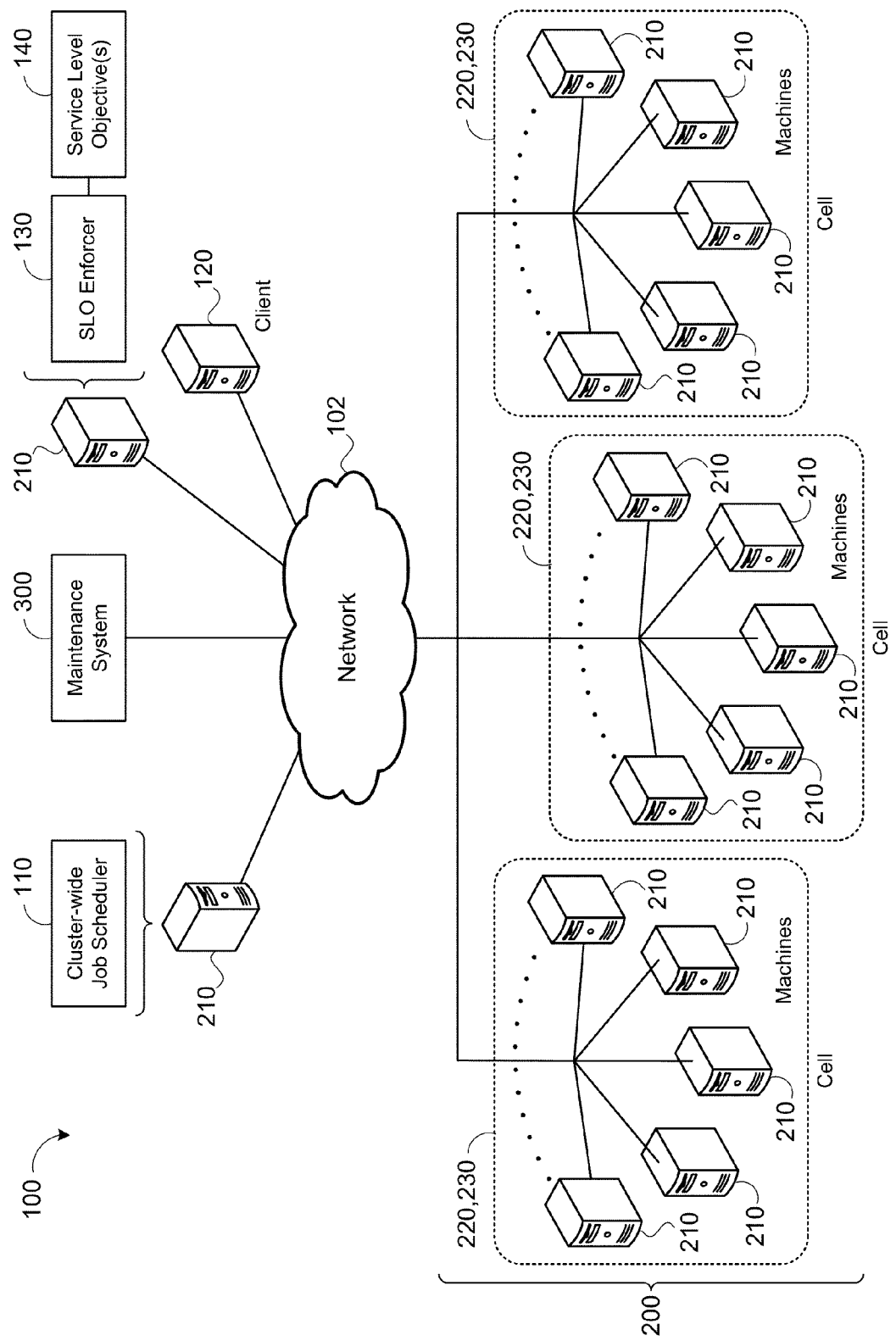
FIG. 1 is a schematic view of an exemplary machine cluster system having a maintenance system.
Figure 2:
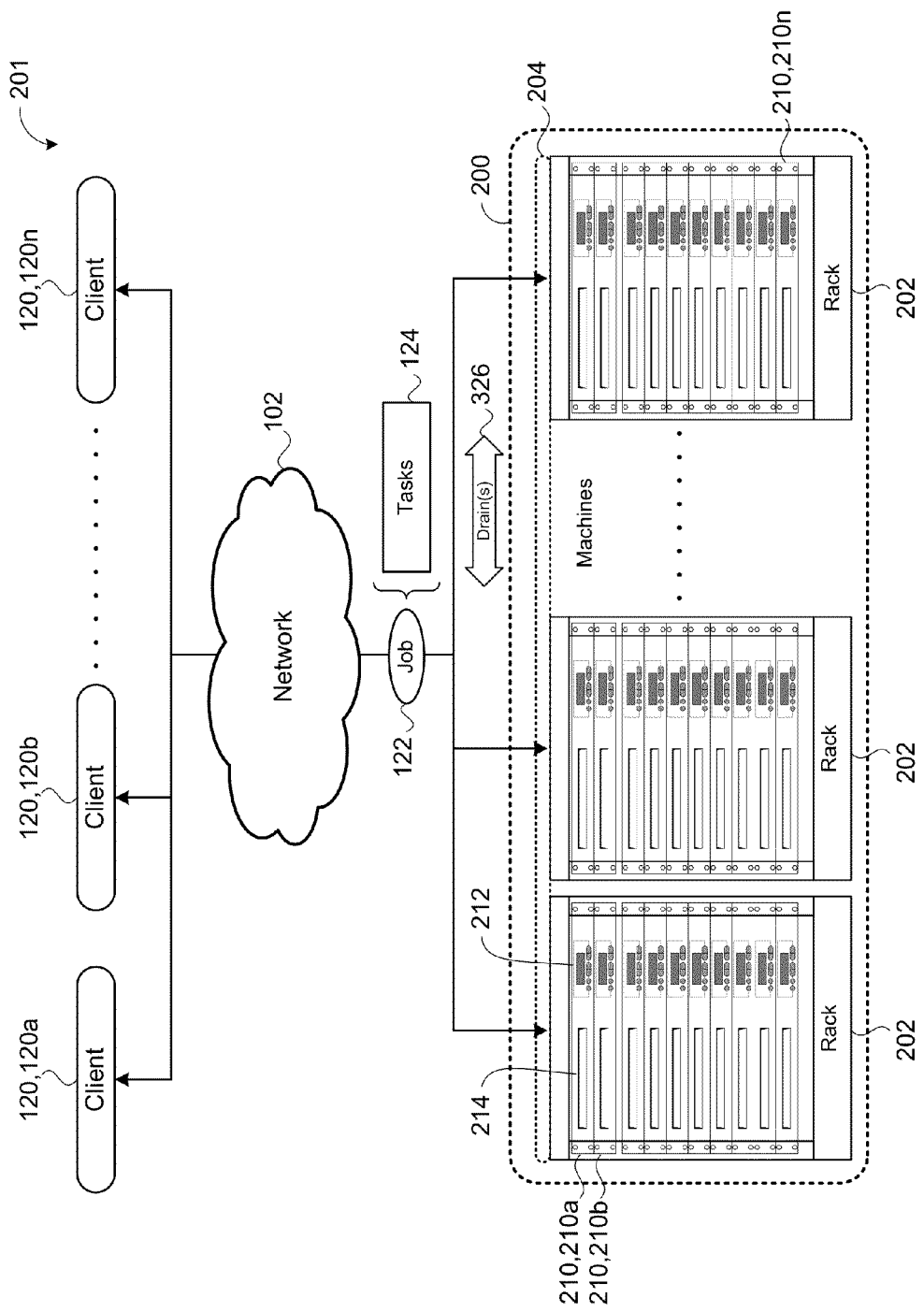
FIG. 2 is a schematic view of an exemplary distributed system.
Figure 3:
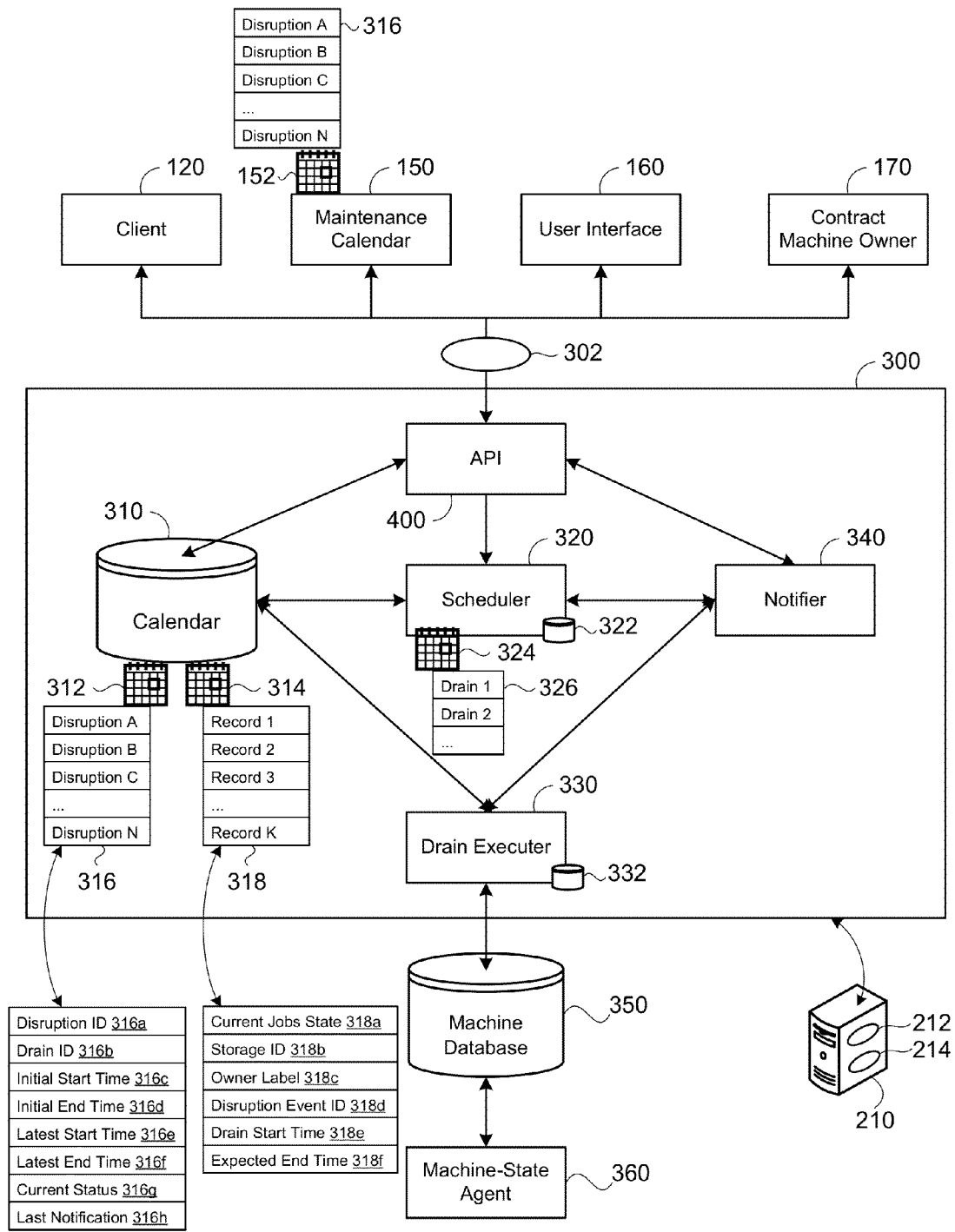
FIG. 3 is a schematic view of an exemplary maintenance system.
Figure 4:
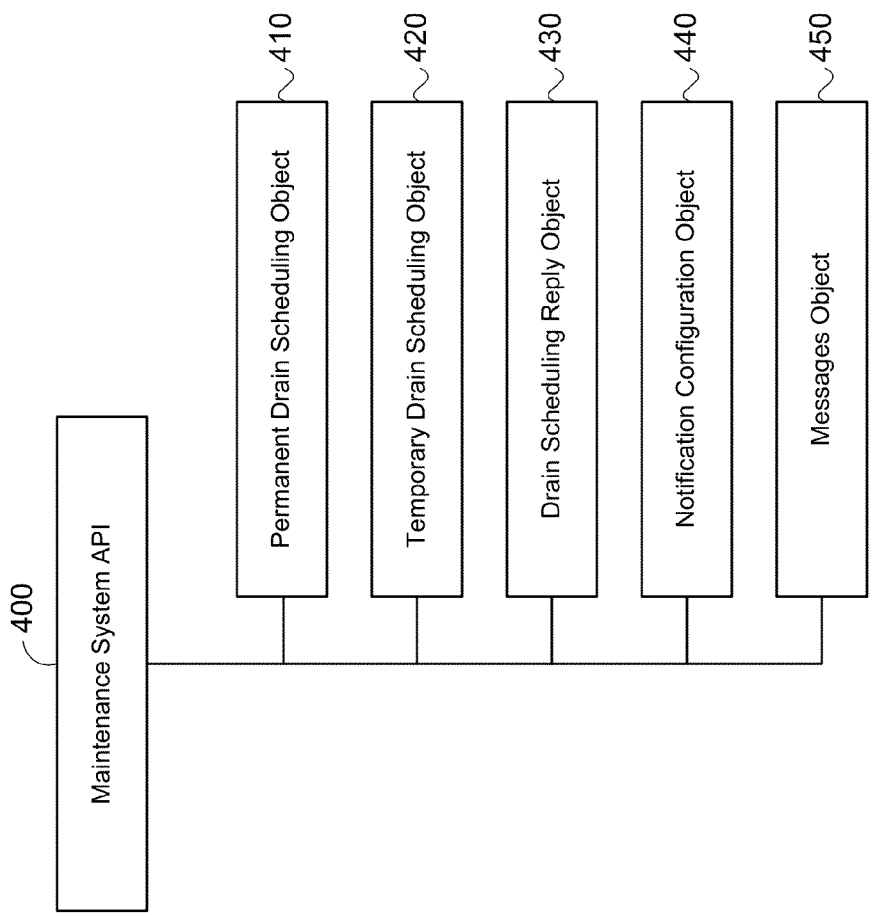
FIG. 4 is a schematic view of an exemplary maintenance system application programming interface.

Referring to FIGS. 1 and 2, in some implementations, a cluster system 100 includes a cluster 200 of machines 210 (e.g., memory hosts, computing processors, computers, etc.) grouped in cells 220. The cluster 200 may implement a distributed system 201 that includes loosely coupled machines 210, 210a-n (e.g., computers or servers implemented as memory hosts or processors), each having a computing resource 212 (e.g., one or more processors) in communication with storage resources 214 (e.g., non-transitory memory, flash memory, dynamic random access memory (DRAM), phase change memory (PCM), and/or disks). The distributed system 201 may include a storage abstraction (e.g., key/value store or file system) overlain on the storage resources 214 that allows scalable use of the storage resources 214 by one or more clients 120, 120a-n. The clients 120 may communicate with the machines 210 through a network 102. In some implementations, the clients 120 send jobs 122, each having one or more tasks 124, to the machines 210.

The cluster machines 210 may be in communication with a maintenance system 300, a cluster-wide job scheduler 110 that coordinates and schedules jobs 122 on the machines 210, and/or a service level objective (SLO) manager 130 via the network 102. The cluster-wide job scheduler 110 and the service level objective (SLO) manager 130 may each execute on a computing processor 212 of a machine 210 and optionally be stored in non-transitory memory 214. The SLO manager 130 may communicate with service level objectives 140, which may be stored in non-transitory memory 214.

The maintenance system 300 reduces the amount of disruption caused by scheduled maintenance to the cluster 200 to provide a higher quality of service to tenant jobs of the cluster 200. Instead of taking the entire cluster 200 offline (e.g., removing the cluster 200 from active use) and conducting maintenance on the entire cluster 200, the maintenance system 300 may subdivide the cluster 200 into independent failure domains 230. A failure domain may be a group of machines 210 or one or more groups of racks 202 of machines 210. Other divisions of the cluster 200 are possible as well. In the example shown, each cell 220 is a failure domain 230; however, other configurations are possible. The failure domain 230 may include a portion of a cell 220, a single cell 220 or multiple cells 220. The maintenance system 300 may perform maintenance on one or more failure domains 230 at a time.

Before maintenance occurs, the maintenance system drains affected machines 210 (referred to as doomed machines) by moving all tasks 124 of the doomed machines 210 to remaining computing capacity in the cluster 200 (i.e., remaining machines 210 in the cluster 200). Moreover, when the doomed machines 210 are drained and become inactive, the computing capacity of the cluster 200 may change, since the total of number of active machines 210 in the cluster 200 may have decreased. The maintenance system 300 may need to move the tasks 124 of the doomed machines 210 by a threshold period of time before the scheduled maintenance, so that work can be performed on empty machines 210. The migration of tasks 124 may need to occur sufficiently slowly (e.g., over a duration of time), so as not to kill a number of tasks 124 and reduce the serving capacity of the jobs 122 in the cluster 200. If a job 122 has 100 tasks 124 and the maintenance system 300 is taking down 1/10 of the cluster 200, the maintenance system 300 does not wish to cause the cluster 200 to suddenly lose a number of data replicas, but rather spreads that disruption over a period of time. A service level objective (SLO) 140 may dictate how fast the maintenance system 300 may disrupt a given job 122 in the cluster 200.

The maintenance system 300 may support temporary or permanent drains 326, on storage and jobs (e.g., temporary or permanent removal of tasks 124 from machines 210). Moreover, the maintenance system 300 may monitor or track the commencement and completion of drains 326. The maintenance system 300 may coordinate with other systems the migration of jobs 122 out of a cluster 200 or a failure domain 230 to allow service or maintenance on machines of that cluster 200 or failure domain 230. For example, the maintenance system 300 may inform an underlying cluster architecture when maintenance is taking place and the duration of that maintenance.

An eviction service level objective (SLO) 140 for the cluster-wide job scheduler 110 can act as a gatekeeper on how quickly a drain 326 may execute. To maintain a reliable execution environment for client jobs 122, the cluster-wide job scheduler 110 may, for example, have an SLO 140 that guarantees the following eviction/scheduling behavior for conforming production jobs 122: 1) no more than max(21, # tasks) tasks 124 for each job 122 may be evicted in any trailing seven day period; 2) no more than max(3, 0.01*# tasks) tasks 124 for each job 122 may be evicted in any trailing 30-minute period; and/or 3) no planned evictions may execute while more than max(1, 0.01*#tasks) tasks 124 are unscheduled (in a pending state). Other eviction/scheduling behaviors for conforming production jobs 122 may also be specified, or the specifics may be modified to adapt to conditions associated with the cluster 200. For example, a service level objective 140 may institute a set of rules that govern how and when tasks 124 are evicted to accommodate maintenance crew schedules, peak computing times during the day, holiday schedules, etc. Service level objectives 140 may be configured to accommodate business and other objectives as well.

The cluster-wide job scheduler 110 may distribute tasks 124 of each job 122 through the cluster 200 on the basis of available resources at job scheduling time, which may lead to a situation where many or all tasks 124 of a job 122 reside on the same maintenance domain 230 (e.g., a PMDC, which is a power conditioner and generator pair having about 2 Megawatts capacity, which may be a standard large unit of failure in a cluster 200). This may force the maintenance system 300 to take a minimum period of time (e.g., one week) to drain the maintenance domain 230. External disruptions, from opportunistic tools such as kernel upgrades, technicians running maintenance scripts, or machine/rack-level failure, increase the drain time even further by consuming an eviction budget for the job 122. The eviction budget may correspond to an eviction SLO 140.

Referring to FIGS. 1-4, in some implementations, a user, such as a client 120, a maintenance calendar 150, a user interface 160, and/or contracted machine owners 170, may interact with the maintenance system 300 through a maintenance system application programming interface (API) 400 executing on a computing processor 212. The maintenance system API 400 allows clients 120 or other users through the user interface 160 to obtain the status of drains, query for information, view status pages, measure if a drain is going over time, and/or determine how close an actual drain time is to an estimated drain time.

The maintenance system API 400 may include a permanent drain scheduling object 410 for scheduling a permanent drain 326, a temporary drain scheduling object 420 for scheduling a temporary drain 326, a drain scheduling reply object 430, a notification configuration object 440, and/or a messages object 450. The permanent and temporary drain scheduling objects 410, 420 may each receive a requesting user identifier, a drain priority, a cluster identifier, and/or scheduling options. The scheduling options may include: 1) start as soon as possible; 2) start as soon as possible after a desired start time; or 3) complete before a desired end time. The permanent and temporary drain scheduling objects 410, 420 may also receive a list of affected machines 210, racks 202, or failure domain (s) 230 or a system identifier identifying a particular system (e.g., whole machine, storage, or job(s)) to drain. The permanent drain scheduling object 410 may receive an action to execute after completion of the drain 326 (e.g., a machine database label change). The temporary drain scheduling object 420 may receive an expected disruption duration and/or a maximum disruption duration. The maintenance system API 400 may include a drain scheduling reply object 430, which receives a drain identifier and returns success/failure indicator, an estimated drain start time, and/or an estimated drain end time.

A user of the maintenance system API 400 may use a notification configuration object 440 to set notification parameters. The notification configuration object 440 may receive a username, an email address, a Boolean setting to email a notification when a drain completes [default: true], a Boolean setting to email a notification if no progress for a threshold progress period of time (e.g., in minutes) [default: off], a Boolean setting to email a notification if a drain will be overdue by greater than a threshold overdue period of time (e.g., in minutes) [default: 0 minutes], a Boolean setting to email a notification if a drain is canceled [default: true], a Boolean setting to email a notification if a drain 326 is rescheduled by more than a threshold rescheduling period of time (e.g., in minutes) [default: off], and/or a Boolean setting to email a notification of a suppression period [default: off].

The maintenance system API 400 may include a messages object 450 that allows a user to start/stop all drain activity (e.g., in a cluster 200), get a status of a drain 326, get a status of a machine 210, get a list of disruptions 316 in a time interval, get a start time for disruptive activity of a temporary drain 326, get an end time of a temporary drain, and/or cancel/modify a drain.

A calendar store 310 may maintain a persistent store of scheduled disruptions 316. In some implementations, the calendar store 310 includes two calendars: a first calendar 312 tracks each disruption 316 as it moves from submitted, to scheduled, to active, and to complete, and a second calendar 314 that tracks disruption activity at the machine level. These calendars 312, 314 may store all scheduled and active disruptions 316, and optionally historical data on completed disruptions 316. The first calendar 312, a disruption request calendar, may store the following information for each scheduled disruption 316: a disruption request identifier 316a, a drain identifier 316b, an initial scheduled drain start time 316c, an initial scheduled drain end time 316d, a latest scheduled drain start time 316e, a latest scheduled drain end time 316f, a current status 316g, and a last notification 316h (e.g., notification time and/or event). The second calendar 314, a machine-granularity calendar, may store sequences of records 318, one sequence per machine 210. Each record 318 may include a current state 318a of jobs 122, a storage identifier 318b, an owner label 318c, a disruption event identifier 318d, a drain start time 318e, and/or an expected drain end time 318f. The maintenance system 300 may load the persistent store 310 into non-transitory memory 214 on startup, and commit all schedule changes and status updates to the persistent calendar store 310. The calendar store 310 can be implemented on top of low-level replicated storage. This provides a reliable, transaction-oriented storage layer that has very few external dependencies, making it suitable for integration with the cluster-wide job scheduler 110.

When the maintenance system 300 receives a disruption request 302 through the maintenance system API 400, a scheduler 320 may first compute a set of machines 210 affected by each drainable scope, and compute the set of affected jobs 122. The scheduler 320 may maintain a model 322 of available eviction quota, based on the location of each task 124 (retrieved from the scheduler) and a schedule of disruptions 316 (e.g., from the calendar store 310), including completed disruptions 316. Using this information, the scheduler 320 may compute start intervals for each drain 326, which are time intervals where there exists sufficient disruption quota to drain the requisite number of tasks 124 without affecting previously scheduled drains 326. The disruption quota may define an amount of allowable disruption to the computing capacity of the cluster 200 over a period of time (e.g., continuous time, set days of a week, or other time increments), where disruption may be caused by executing a drain 326. The disruption quota may be influenced by one or more service level objectives 140. In some examples, a service level objective 140 sets or defines the disruption quota. A drain 326 can be scheduled in any interval that is part of the intersection of all affected jobs' start intervals. Once a suitable start time is found, the scheduler 320 may perform a simulation of the drain's progress, by replaying all scheduled disruptions 316 and quota availability events, and then generate a projected end time for the chosen start time of the requested disruption 316.

For opportunistic disruption events, such as kernel upgrades and rack switch firmware upgrades, the maintenance system may choose start and end drain times that are as early as possible, to minimize the effect on hardware maintenance drains, which are scheduled as late as possible. As scheduled hardware maintenance drains are known well in advance, this allows the maintenance system 300 to schedule them with a large gap between the drain and any opportunistic activity. It is important to be able to guarantee the completion of these drains on time, as technician hours and hardware migrations are expensive if wasted.

In some implementations, the scheduler 320 analyzes each job 122 of the cluster 200 to determine how many tasks 124 of each job 122 are in a region of doomed machines 210 and then estimates how long (e.g., based on a service level objective (SLO) 140) it will take to drain those tasks 124 out of the doomed machines 210 without unduly affecting the job 122 and without violating an eviction SLO 140. The scheduler 320 may analyze all jobs 122 in the cluster 200 and their determined drain times to select the worst drain time of all of the jobs 122 and use that drain time as the estimated drain time for the drain 326 (which may start at a particular time).

The scheduler 320 may schedule drains in advance and determine whether two or more drains conflict. The scheduler 320 may maintain a calendar 324 of drains 326 (e.g., in the calendar store 310), each having corresponding start and end times on one or more machines 210. The scheduler 320 may maintain drain start and end times, maintenance/work start and end times, and/or service restoration times for each machine 210 of the cluster 200. When one or more drains 326 are scheduled to commence, the scheduler 320 may notify a scheduling service, such as the cluster-wide job scheduler 110, of a scheduled drain 326 (e.g., by issuing issue one or more commands) and a corresponding set of doomed machines 210 that are no longer hospitable for production jobs. Over a period of time, the scheduling service 110 evicts tasks 124 of jobs 122 from the doomed machines 210 and moves the evicted jobs 122 to other machines 210 having capacity for those jobs 122. The scheduling service 110 may act in compliance with a service level objective 140, e.g., by evicting and migrating jobs 122 at a rate in compliance with a minimum drain time. The scheduler 320 may track actual drain times for comparison with the estimated drain times, so as to estimate more accurate drain times in the future. When the estimated drain time ends, all of the machines 210 should be empty.

In some implementations, when a user schedules a disruption 316 (e.g., via the maintenance system API 400), the scheduler 320 selects a time that allows the disruption 316 to complete within any requested start/stop interval, while respecting the overall capacity and disruption budgets of an affected collection of machines 210, such as a cell 220. The scheduler 320 may determine an estimated job drain time $T_D$ for a disruption request 302 as follows:

$$TD = \max x, y + S + D \quad (1)$$

$$y = \text{global job scheduler task limit/number of tasks to drain} \quad (2)$$

where x is a maximum drain time for the job 122, based on the job size and the number of affected tasks 124, y is a maximum drain rate per second, S is a safety margin (time), and D is an estimated disruption duration (time).

The scheduler 320 may determine an estimated storage drain time $T_S$ for a disruption request 302 as follows:

$$TS = n2 \times \max 15\min., br + S \quad (3)$$

where n is the number of affected racks, b is a maximum number of bytes in any one rack, and r is a maximum drain rate (bytes/second).

After computing an estimated drain time $T_D$, $T_S$, the scheduler 320 determines a scheduled time for the drain 326 among existing drains 326, packing drains as early as possible. In some implementations, the scheduler 320 handles one active drain 326 at a time. If there is no valid packing, the scheduler 320 may reschedule jobs 122 in the same priority band by removing sets of jobs 122 from the schedule and then rescheduling the jobs 122 with the largest first. If that does not work, the scheduler 320 may remove a lower-priority disruption 316, repeat the process, and then try to reschedule the evicted disruption request 302.

In some implementations, the scheduler 320 provides an estimate of how long it will take to evict all tasks 124 of a particular job 122 as well as an estimated duration of an entire drain 326, which may include one or more jobs 122. Given a proposed drain 326 and the drain schedule 324, the scheduler may determine whether the proposed drain 326 is feasible and an estimated drain time. The scheduler 320 may break down the drain 326 into jobs 122 and corresponding tasks 124 and, based on a service level objective 140, how much disruption quota will be used for evicting each job 122. Given a proposed start time, the scheduler 320 may determine a corresponding end time and whether the drain 326 is feasible at all.

The drain scheduler 320 may schedule a drain 326 based on attributes of the drain 326, such as a drain type (e.g., for certain types of maintenance or on certain types of machines) and/or defined criteria, such as desired start and end times. For any given drain 326, the drain scheduler 326 may identify a valid timeslot and pack drains together over a certain time horizon. Depending on the drain type, the scheduler 320 may try to schedule the drain 326 as early as possible or as late as possible or as close as possible to a desired time. For example, for rack maintenance, the scheduler 320 may try to determine an earliest possible start time for the scheduled drain 326. In another example, a large and involved maintenance may be scheduled as close as possible to a desired end time, to accommodate workers and avoid idle worker time or idle machine time.

The scheduler 320 may perform checks to ensure that the scheduled disruptions 316 will not place an affected cell 220 in an unsafe state. In some examples, the scheduler 320 determines an available machine capacity (via a job scheduler interface) or an available storage capacity (if draining storage). The scheduler 320 may not reduce a free pool below a safe level or make tasks 124 impossible to schedule.

The scheduler 320 may run when a user adds a new disruption 316 (e.g., for a feasibility check and scheduling), before starting any disruption 316 (e.g., to make sure the schedule/drain calendar 314 is still valid), any time a disruption 316 does not occur according to the estimated plan (e.g., runs over time), or when a disruption 316 completes significantly ahead of schedule (e.g., to allow rescheduling disruptions earlier if possible). The maintenance system 300 may execute the scheduler 320 to run continual/regular checks on the status of all disruptions 316.

In some implementations, whenever the scheduler 320 schedules a new drain 326, mutates a drain 326 to change its timing or contents (i.e., affected machines 210), checks the feasibility of a drain 326, checks the progress of a drain 326 (e.g., every 10 min.), the scheduler 320 uses the calendar store 310.

For example, if the calendar store 310 has five scheduled drains 326, the scheduler 320 removes the drain 326 under consideration and splits the remaining four drains 326 into sets of expected evictions for each job 122 in the cluster 200. If two drains 326 already occurred and three drains 326 remain, the scheduler 320 estimates a drain time for the first of the last three drains 326. The scheduler 320 removes an amount of disruptions corresponding to the first two drains 326 from a disruption quota, determines when the fourth drain 326 is due to start, which is a boundary by which the third drain 326 must finish to avoid a drain conflict, and estimates a drain time for the drain 326 under consideration. The drain time estimation includes, for a particular drain 326, determining all of the affected machines 210, determining which jobs 122 have tasks 124 on the affected machines 210, and for each job 122 having at least one task 124 on the affected machines 210, determining a drain time to evict that at least one task 124 on the affected machines 210. The estimated job drain time may be based on the size of the job, the amount of disruption quota already consumed by previous drains 326, past drain times for other jobs 122, and/or a service level objective 140 (e.g., eviction policy). The scheduler 320 may use the estimated drain time to determine when to schedule that drain 326.

In some implementations, a drain executer 330 executes the drains 326 and may communicate with the cluster-wide job scheduler 110 and the machine-state agent 360 to designate machines 210 as being not suitable for production jobs. The calendar store 310 may notify the drain executer 330 and the scheduler 320 that a disruption should begin. The scheduler 320 may check the feasibility of the drain 326 to ensure that it is still feasible, and then the drain executer 330 notifies a machine-state agent 360 of the drain 326 via label changes in a machine database 350. The exact set of label changes depends on the type of drain 326 (e.g., a temporary drain or a permanent drain).

For temporary drains 326, the drain executer 330 marks affected machines 210 in the machine database 350 with a problem label having a symptom of "laming" and a note of lame@<drainId>[;excluded_server=server_type[,server-type]]. The drain executer 330 may monitor the status of the drain 326 to determine when the drain 326 is finished. Once all affected machines 210 have the "lame" label the disruptive activity can start. Once the activity begins the drain executer 330 applies an expiration label, such as "stop_expires_YYYMM/DD-HH:MM:SS.000@drain=<drainId>," in the machine database 350 and the problem label is removed. This prevents the machine-state agent 360 from repairing the machine 210 while the activity is ongoing. Notifying the drain executer 330 that the activity is complete (or exceeding the maximum activity duration) may cause the stop label to be removed, which allows the machine-state agent 360 to restore the machine 210 to a working condition.

For permanent drains 326, the drain executer 330 may notify the machine-state agent 360 of the drain 326 via the machine database 350 by setting a jobs label to "none" and/or a storage label to "none." The drain executer 330 may track a machine state by checking server notes in machine database 350 to determine if the machine 210 has stopped. Once all the machines 210 have been drained the drain 326 is complete.

In some implementations, when it's time for a drain 326 to start, the drain executer 330 may makes sure that there are no other running drains 326. If the system is not busy, the drain executer 330 may perform basic safety checks and set draining labels for the doomed machines 210 in the machine database 350. These labels are picked up by the machine-state agent 360, which sets a priority of the machines 210 (e.g., to a maximum priority). This prevents any further production jobs from being scheduled on the machine 210, and causes the cluster-wide job scheduler 110 to evict all non-exempt production jobs 122 from the doomed machine 210 under the eviction SLO 140, which is mediated by the SLO manager 130. By using the labels in the machine database 350, the cluster-wide job scheduler 110 avoids rescheduling jobs into machines 210 (e.g., PMDCs) that will be under maintenance in a near future time horizon, such as within the next 24-72 hours, as this would trigger an unnecessary eviction. Once the machine-state agent 360 reads the machine 210 as lame, it sets the appropriate labels in the machine database 350, and the drain 326 is complete.

In some implementations, the SLO manager 130 enforces quotas of the service level objectives 140 and may act as a gate keeper and timekeeper for when job or task evictions may occur by preventing disruptions of tasks 124, storage, or machines 210 from occurring too quickly. The scheduler 320 may communicate with the SLO manager 130 before evicting any jobs 122. The SLO manager 130 may indicate whether a particular task 124 may be evicted at that moment. Since the SLO manager 130 may be an instantaneous function, rather than a predictive function, the scheduler 320 may merely query the SLO manager 130 to obtain an eviction approval/disapproval for that moment in time.

The SLO manager 130 may enforce an the eviction SLO 140 as either a fixed-interval model (where one eviction is allowed every certain period of time) or as a quota model (where a job 122 can accumulate quota if it has no evictions, and then rapidly evict multiple tasks 124). The cluster-wide job scheduler 110 may have an SLO 140 that reserves the right to evict up to 4 racks 202 per day (e.g., 1 per hour) with no advance notice, outside of other SLOs 140. This quota is typically unused, and is invoked only when there are unexpected network or power events. While this is a much more impactful operation than SLO-bound gradual evictions, the maintenance system 300 may use this as a mechanism of last resort if drains 326 appear to be failing.

A contract machine owner 170 may specify a preferred service level objective 140 or eviction policy. Exemplary policies include opting out of eviction, requesting en-mass eviction (in the case that each individual task eviction sets the job 122 as a whole back), giving a task 124 a threshold period of time (e.g., 15 seconds −15 minutes) to gracefully shutdown before its eviction, or having a task 124 evict at an opportunistic time.

In some implementations, the service level objective (SLO) 140 may be given a job 122 of n replicas, the maintenance system 300 may disrupt m replicas per week. This may mean that on any given week, the maintenance system 300 may disrupt the same replica m times or m replicas each once that week, or a permutation in between. The SLO 140 may provide a level of burstiness, which may be a rate of disruption within that week. For example, the SLO 140 may allow eviction of a percentage of a job 122 over a certain period of time (e.g., 1% over 30 minutes). Based on the SLO(s), the scheduler 320 may determine a minimum drain time (e.g., using a maximum of one job or task per a minimum drain time). Rather than using an interval-based system, the scheduler 320 may track the intervals between evictions and a disruption quota usage (e.g., quota used per week). Using a disruption quota usage history, the scheduler 320 may determine a relative possible rate of disruption for a given job 122. If no job evictions occurred over a recent period of time, the scheduler 320 may determine that a current job 122 may use the disruption quota at a relatively greater rate. A quota-based estimation accounts for a history of job evictions over a period of time, which allows the scheduler 320 to determine relatively more accurate drain time estimations.

While the drain executer 330 is executing a drain 326, the scheduler 320 may re-compute the expected drain end time 318*f,* using the current set of tasks 124 on each machine 210. If a drain 326 is running over time, the scheduler 320 may reschedule the expected end time 318*f,* and verify that it will not interfere with other scheduled drains 326. If it will, the scheduler 320 may either remove or reschedule the conflicting drains 326 (in the case of opportunistic work) or raise an alert (in the case of scheduled maintenances).

Once a drain 326 begins, but before the disruptive activity starts, the drain executer 330 may monitor a status of the drain 326 for determining its progression. The drain executer 330 may maintain an internal model 332 for estimating whether the drain 326 is likely to complete on time or run late. The model 332 may account for different draining scenarios, such as when blocks of machines 210 are held up and then drain rather quickly or the time to drain having a long tail with a small number of machines 210 taking a very long time. Once a drain 326 has fallen behind schedule, the drain executer 330 may issue a notification to the notifier 340 (e.g., so that action can be taken to either "unstick" the drain or delay the activity). In some implementations, the internal model 332 may include or communicate with a service level objective 140 or policy. The internal model 332 may receive data about why a machine 210 cannot be drained and/or how long until an issue will be resolved.

The notifier 340 may provide push and/or pull notifications to drain creators. In some examples, the notifier 340 provides push notifications via a Paxos-based client API and/or via email to drain creators. The notifier 340 may provide pull notifications via the persistent calendar store 310 (which can be read by any user) and/or via an API. In order to support tasks that may need to take action before a disruption 316, the notifier 340 may publish upcoming and active disruptions 316 to a Paxos file. An observer may monitor the Paxos file, note relevant changes to the disruption schedule 312, and call a callback at a configurable interval before disruption 316 is to begin. The observer may be used by storage servers in super clusters, as they are not be migrated ahead of scheduled maintenance, but instead switch non-transitory memory to read-only mode.

The distributed storage layer 204 may listen to the notifier 340 for upcoming disruptions 316 on machines 210 and put the machine 210 in a maintenance mode (e.g., place non-transitory memory 214 of the affected machine 210 a read-only mode). If a storage manager is unable to communicate with the machine 210, whether due to disruption in the machine itself (reboot) or its network connectivity (rack upgrade), the storage manager may consider the machine DOWN. Clients 120 may have to reconstruct any slices on the machine 210 while it is DOWN, but the system will not reconstruct missing slices on that machine 210. The distributed storage layer 204 may notice when the maintenance is over and transition the machine 210 either from READ-ONLY to HEALTHY (if currently reachable) or DOWN to DEAD (if unreachable).

Once a drain 326 is complete, the maintenance system 300 may notify a storage infrastructure and/or machine management infrastructure 350 (machine database) that maintenance will be performed on a set of machines 210, so that those infrastructures know that the machines will be unavailable for a period of time.

The machine-state agent 360 (e.g., a master machine life-cycle service) may indicate that the machine 210 stopped and is not suitable for production, and may be responsible for sending machines 210 to repairs and migrating certain classes of jobs 122. The maintenance system 300 notifies the machine-state agent 360 of the drain 326, so that the machine-state agent 360 does not send any affected machines 210 to repairs when they go off-line (e.g., thinking that those machines 210 have issues). For example, the maintenance system 300 may assign stop labels to the doomed machines 210, so that the machine-state agent 360 does not send those machines 210 to repairs (e.g., a repair diagnosis service) when those machines 210 are no longer available for a period of time.

A distributed storage layer 204 may place non-transitory memory 214 of the doomed machines 210 in a read-only mode upon receiving an indication from the maintenance system 300 that the doomed machines 210 will become unavailable for a discrete period of time. While in the read-only mode, the doomed machines 210 cannot receive data writes. When the doomed machines 210 go off-line, the distributed storage layer 204 may suppress reconstruction of the corresponding data, since the distributed storage layer 204 knows that the machines 210 will eventually come back online. Whereas, if the machines 210 went off-line for a period of time (e.g., two hours) without receiving a drain notification from the maintenance system 300, the distributed storage layer 204 may attempt to reconstruct the data, which appears lost, to re-attain a certain replication level of those host machines.

Once the machine-state agent 360 and the distributed storage layer 204 are notified of the drains 326 and the doomed machines 210 have been drained, maintenance work may ensue on the doomed machines 210, which are off-line. Once the maintenance work is complete on the doomed machines 210, the doomed machines 210 can be restored to a serving state.

The maintenance system 300 may use a notifier (e.g., executing on a computing processor 212) to issue notifications. The notifier 340 may include a push and/or a pull notification application programming interface (API), which allows a client (e.g., another cluster component) to check on the status of drains 326. In some implementations, the maintenance calendar 150, which controls when maintenance is scheduled, pulls notification information from the notifier 340 to monitor progression of a drain 326 or to discern a conflict between drain times.

In some implementations, the maintenance calendar 150 maintains a calendar 152 of scheduled disruptions 316, such as start and end times of scheduled drains 326, the machines 210 affected by the drains 326, start and end times of scheduled work, etc. The data storage layer 204 may access the maintenance calendar 150 to receive notification of a scheduled disruption 316, so as to determine when to transition into a read-only mode and when to suppress reconstruction of data.

Figure 5:
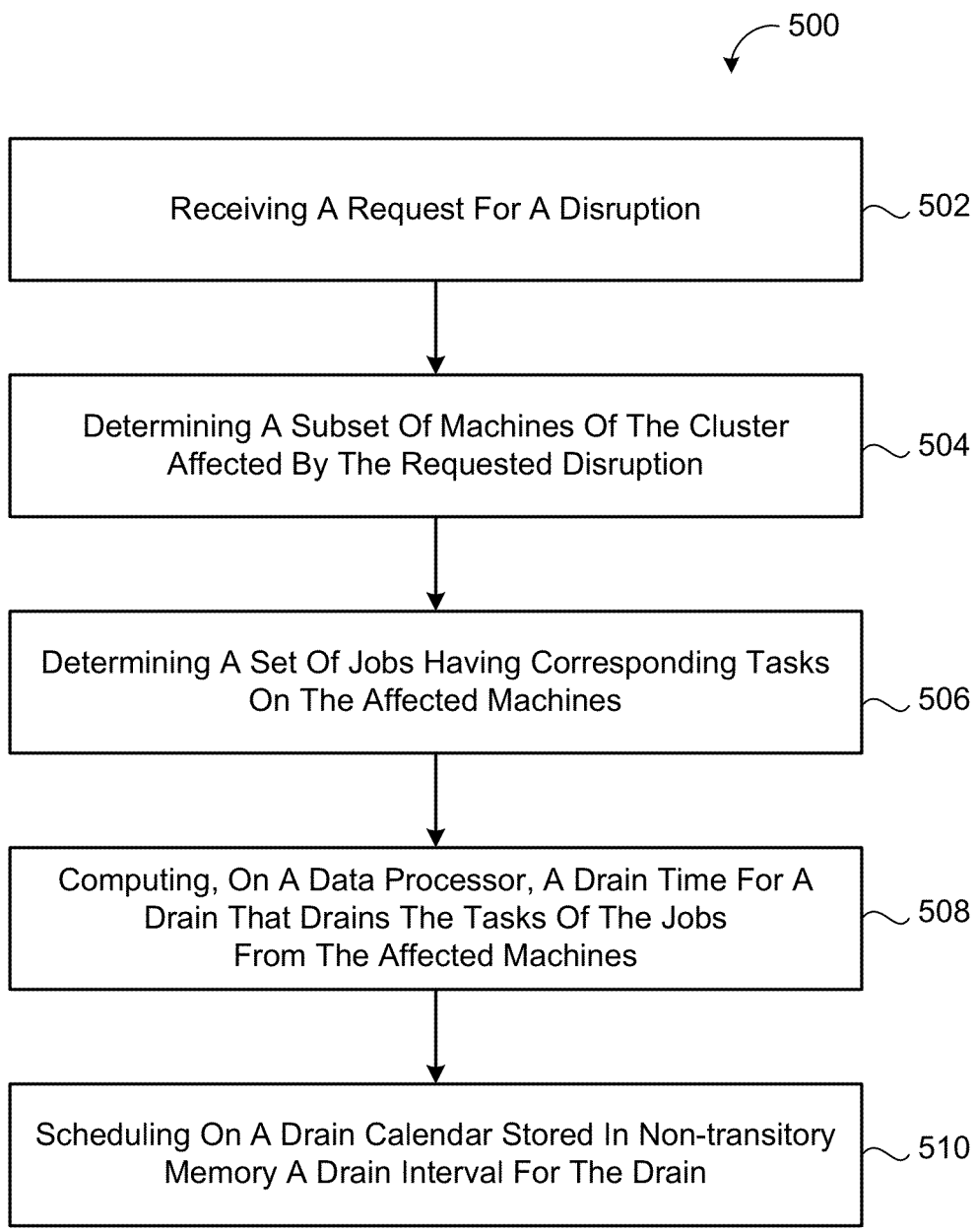
FIG. 5 provides an exemplary arrangement of operations for a method of operating a cluster of machines.

FIG. 5 provides an exemplary arrangement 500 of operations for a method of operating a cluster 200 of machines 210. The method includes receiving 502 a request 302 (e.g., from a client 120) for a disruption 316, determining 504 a subset of machines 210 of the cluster 200 affected by the requested disruption 316, and determining 506 a set of jobs 122 having corresponding tasks 124 on the affected machines 210. The method also includes computing 508, on a data processor 212, a drain time for a drain 326 that drains the tasks 124 of the jobs 122 from the affected machines 210, and scheduling 510 on a drain calendar 324 stored in non-transitory memory 214 a drain interval for the drain 326, the drain interval having a start time and an end time.

In some implementations, the method includes determining the scheduled drain interval based on the computed drain time and other scheduled drain times of the calendar 324. The method may include determining the scheduled drain interval based on attributes of the disruption request 302. The attributes may include at least one of a drain type, a request to start as soon as possible, a request to start as soon as possible after a desired start time, a request to complete before a desired end time, or a list of affected machines 210.

In some implementations, the method includes computing the drain time based on a service level objective 140 stored in non-transitory memory 214. The service level objective 140 may include an eviction rule allowing a maximum number of task evictions per job 122 over a period of drain time. In some examples, the eviction rule allows a maximum number of task evictions per job 122 over a period of drain time based on a machine location (e.g., on a certain rack 202) of each task 124 and a schedule 312 of disruptions 316 for the cluster 200. The service level objective 140 may include an eviction quota defining an allowable amount of machine disruption over a period of time across the entire cluster 200.

The method may include limiting machine disruption to a failure domain 230 of the cluster 200. The failure domain 230 includes a subset of machines 210 of the cluster 200, where the cluster 200 includes multiple failure domains 230.

The method may include executing the drain 326 and draining the tasks 124 of the jobs 122 from the affected machines 210. This may include evicting the tasks 124 from the affected machines 210 and moving the evicted tasks 124 to other machines 210 in the cluster 200 unaffected by the disruption request 302, for example, by a scheduled maintenance time and/or according to a service level objective 140. The method may include monitoring a progress of the drain 326 and providing a notification of the drain progress.

In some implementations, the method includes temporarily or permanently draining memory 214 or jobs 122 from the affected machines 210. The method may include computing a job drain time $T_D$ to drain the tasks 124 of each job or a storage drain time $T_S$ to drain memory 214 of each affected machine 210.

The method may include maintaining, in non-transitory memory 214, a disruption request calendar 312 for tracking disruption requests 302 and a machine-granularity calendar 314 for tracking disruption activity on the machines 210. The disruption request calendar 312 may store for each disruption request 302 at least one of a disruption request identifier 316a, a drain identifier 316b, an initial scheduled drain start time 316c, an initial scheduled drain end time 316d, a latest scheduled drain start time 316e, a latest scheduled drain end time 316f, a current status 316g, or a last notification 316h (e.g., notification time and/or event). The machine-granularity calendar 314 may store sequences of records 318, one sequence per machine 210. Each record 318 may include a current state 318a of jobs 122, a storage identifier 318b, an owner label 318c, a disruption event identifier 318d, a drain start time 318e, and/or an expected drain end time 318f.

When the drain 326 is complete, the method may include notifying a machine-state agent 360 of the drain completion. The machine-state agent 360 may not label the affected machines 210 for repair when the affected machines 210 go off-line based on the received drain completion notification. Moreover, the method may include placing non-transitory memory 214 of the affected machines 210 in a read-only mode when the drain 326 is complete.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, non-transitory memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a non-transitory memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of operating a cluster of machines, the method comprising:
    receiving a request for a disruption;
    determining a subset of machines of the cluster affected by the requested disruption;
  determining a set of jobs having corresponding tasks on the affected machines;
    computing, on a data processor, a drain time for a drain that drains the tasks of the jobs from the affected machines; and
    scheduling on a drain calendar stored in non-transitory memory a drain interval for the drain, the drain interval having a start time and an end time.

2. The method of claim 1, further comprising determining the scheduled drain interval based on the computed drain time and other scheduled drain times of the calendar.

3. The method of claim 2, further comprising determining the scheduled drain interval based on attributes of the disruption request, the attributes comprising at least one of a drain type, a request to start as soon as possible, a request to start as soon as possible after a desired start time, a request to complete before a desired end time, or a list of the affected machines.

4. The method of claim 1, further comprising computing the drain time based on a service level objective stored in the non-transitory memory.

5. The method of claim 4, wherein the service level objective comprises an eviction rule allowing a maximum number of task evictions per job over a period of drain time.

6. The method of claim 5, wherein the eviction rule allows a maximum number of task evictions per job over a period of drain time based on a machine location of each task and a schedule of disruptions for the cluster.

7. The method of claim 4, wherein the service level objective comprises an eviction quota defining an allowable amount of machine disruption over a period of time across the entire cluster.

8. The method of claim 1, further comprising limiting machine disruption to a failure domain of the cluster, the failure domain comprising a subset of machines of the cluster, the cluster comprising multiple failure domains.

9. The method of claim 1, further comprising executing the drain and draining the tasks of the jobs from the affected machines, by evicting the tasks from the affected machines and moving the evicted tasks to other machines in the cluster unaffected by the disruption request.

10. The method of claim 9, further comprising evicting the tasks from the affected machines and moving the evicted tasks to the unaffected machines by a scheduled maintenance time and according to a service level objective.

11. The method of claim 10, wherein the service level objective comprises an eviction rule allowing a maximum number of task evictions per job over a period of drain time.

12. The method of claim 11, wherein the eviction rule allows a maximum number of task evictions per job over a period of drain time based on a machine location of each task and a schedule of disruptions for the cluster.

13. The method of claim 10, wherein the service level objective comprises an eviction quota defining an allowable amount of machine disruption over a period of time across the entire cluster.

14. The method of claim 9, further comprising monitoring a progress of the drain and providing a notification of the drain progress.

15. The method of claim 1, further comprising computing a job drain time to drain the tasks of each job, the job drain time ($T_D$) computed as:

$$T_D = \max x, y + S + D$$

wherein y is a maximum drain rate per second defined as a global job scheduler task limit divided by a number of tasks to drain, x equals a maximum drain time for the job based on the job size and the number of affected tasks of the job, S is a time safety margin, and D is a disruption duration.

16. The method of claim 1, further comprising computing a storage drain time to drain memory of each affected machine, the storage drain time ($T_S$) computed as:

$$T_S = n2 \times \max 15\text{min.}, br + S$$

wherein n is a number of affected racks of machines, b is a maximum number of bytes in any one rack, r is a maximum drain rate, and S is a time safety margin.

17. The method of claim 1, further comprising maintaining, in the non-transitory memory, a disruption request calendar for tracking disruption requests and a machine-granularity calendar for tracking disruption activity on the affected machines.

18. The method of claim 17, wherein the disruption request calendar stores for each disruption request at least one of a disruption request identifier, a drain identifier, an initial scheduled drain start time, an initial scheduled drain end time, a latest scheduled drain start time, a latest scheduled drain end time, a current drain status, or a last notification.

19. The method of claim 17, wherein the machine-granularity calendar stores a sequences of records, one sequence per machine, each record comprising at least one of a current state of jobs, a storage identifier, an owner label, a disruption event identifier, a drain start time, or an expected drain end time.

20. The method of claim 1, further comprising:
    executing the drain, draining the tasks of the jobs from the affected machines; and
    when the drain is complete, notifying a machine-state agent of the drain completion, the machine-state agent avoiding labeling the affected machines for repair when the affected machines go off-line based on the received drain completion notification.

21. A maintenance system for a cluster of machines, the maintenance system comprising:
    a scheduler executing on a data processor, wherein in response to receiving a request for a disruption, the scheduler:

determining a subset of machines of the cluster affected by the requested disruption;

determining a set of jobs having corresponding tasks on the affected machines;

computing, on the data processor, a drain time for a drain that drains the tasks of the jobs from the affected machines; and scheduling on a drain calendar stored in non-transitory scheduler memory a drain interval for the drain, the drain interval having a start time and an end time.

22. The maintenance system of claim 21, wherein the scheduler determines the scheduled drain interval based on the computed drain time and other scheduled drain times of the calendar.

23. The maintenance system of claim 22, wherein the scheduler determines the scheduled drain interval based on attributes of the disruption request, the attributes comprising at least one of a drain type, a request to start as soon as possible, a request to start as soon as possible after a desired start time, a request to complete before a desired end time, or a list of the affected machines.

24. The maintenance system of claim 21, wherein the scheduler computes the drain time based on a service level objective stored in the scheduler non-transitory memory.

25. The maintenance system of claim 24, wherein the service level objective comprises an eviction rule allowing a maximum number of task evictions per job over a period of drain time.

26. The maintenance system of claim 25, wherein the eviction rule allows a maximum number of task evictions per job over a period of drain time based on a machine location of each task and a schedule of disruptions for the cluster.

27. The maintenance system of claim 24, wherein the service level objective comprises an eviction quota defining an allowable amount of machine disruption over a period of time across the entire cluster.

28. The maintenance system of claim 21, wherein the scheduler limits machine disruption to a failure domain of the cluster, the failure domain comprising a subset of machines of the cluster, the cluster comprising multiple failure domains.

29. The maintenance system of claim 21, further comprising a drain executer executing the drain and draining the tasks of the jobs from the affected machines, by evicting the tasks from the affected machines and moving the evicted tasks to other machines in the cluster unaffected by the disruption request.

30. The maintenance system of claim 29, wherein the drain executer evicts the tasks from the affected machines and moving the evicted tasks to the unaffected machines by a scheduled maintenance time and according to a service level objective.

31. The maintenance system of claim 30, wherein the service level objective comprises an eviction rule allowing a maximum number of task evictions per job over a period of drain time.

32. The maintenance system of claim 31, wherein the eviction rule allows a maximum number of task evictions per job over a period of drain time based on a machine location of each task and a schedule of disruptions for the cluster.

33. The maintenance system of claim 30, wherein the service level objective comprises an eviction quota defining an allowable amount of machine disruption over a period of time across the entire cluster.

34. The maintenance system of claim 29, wherein the scheduler monitors a linear or non-linear progress of the drain and provides a notification of the drain progress.

35. The maintenance system of claim 21, wherein the scheduler computes a job drain time to drain the tasks of each job, the job drain time ($T_D$) computed as:

$$T_D = \max x, y + S + D$$

wherein y is a maximum drain rate per second defined as a global job scheduler task limit divided by a number of tasks to drain, x equals a maximum drain time for the job based on the job size and the number of affected tasks of the job, S is a time safety margin, and D is a disruption duration.

36. The maintenance system of claim 21, wherein the scheduler computes a storage drain time to drain memory of each affected machine, the storage drain time ($T_S$) computed as:

$$T_S = n2 \times \max 15\min., br + S$$

wherein n is a number of affected racks of machines, b is a maximum number of bytes in any one rack, r is a maximum drain rate, and S is a time safety margin.

37. The maintenance system of claim 21, further comprising calendar store in communication with the scheduler and maintaining, in the scheduler non-transitory memory, a disruption request calendar for tracking disruption requests and a machine-granularity calendar for tracking disruption activity on the affected machines.

38. The maintenance system of claim 37, wherein the disruption request calendar stores for each disruption request at least one of a disruption request identifier, a drain identifier, an initial scheduled drain start time, an initial scheduled drain end time, a latest scheduled drain start time, a latest scheduled drain end time, a current drain status, or a last notification.

39. The maintenance system of claim 37, wherein the machine-granularity calendar stores a sequences of records, one sequence per machine, each record comprising at least one of a current state of jobs, a storage identifier, an owner label, a disruption event identifier, a drain start time, or an expected drain end time.

40. The maintenance system of claim 21, wherein the scheduler notifies a machine-state agent of a drain completion, the machine-state agent avoiding labeling the affected machines for repair when the affected machines go off-line based on the received drain completion notification.

41. The maintenance system of claim 40, wherein the machine-state agent places non-transitory machine memory of the affected machines in a read-only mode when the drain is complete.

\* \* \* \* \*